E. P. NOYES.
CONSTANT PRESSURE INTERNAL COMBUSTION APPARATUS.
APPLICATION FILED AUG. 26, 1905.
987,160.
Patented Mar. 21, 1911.
6 SHEETS—SHEET 1.
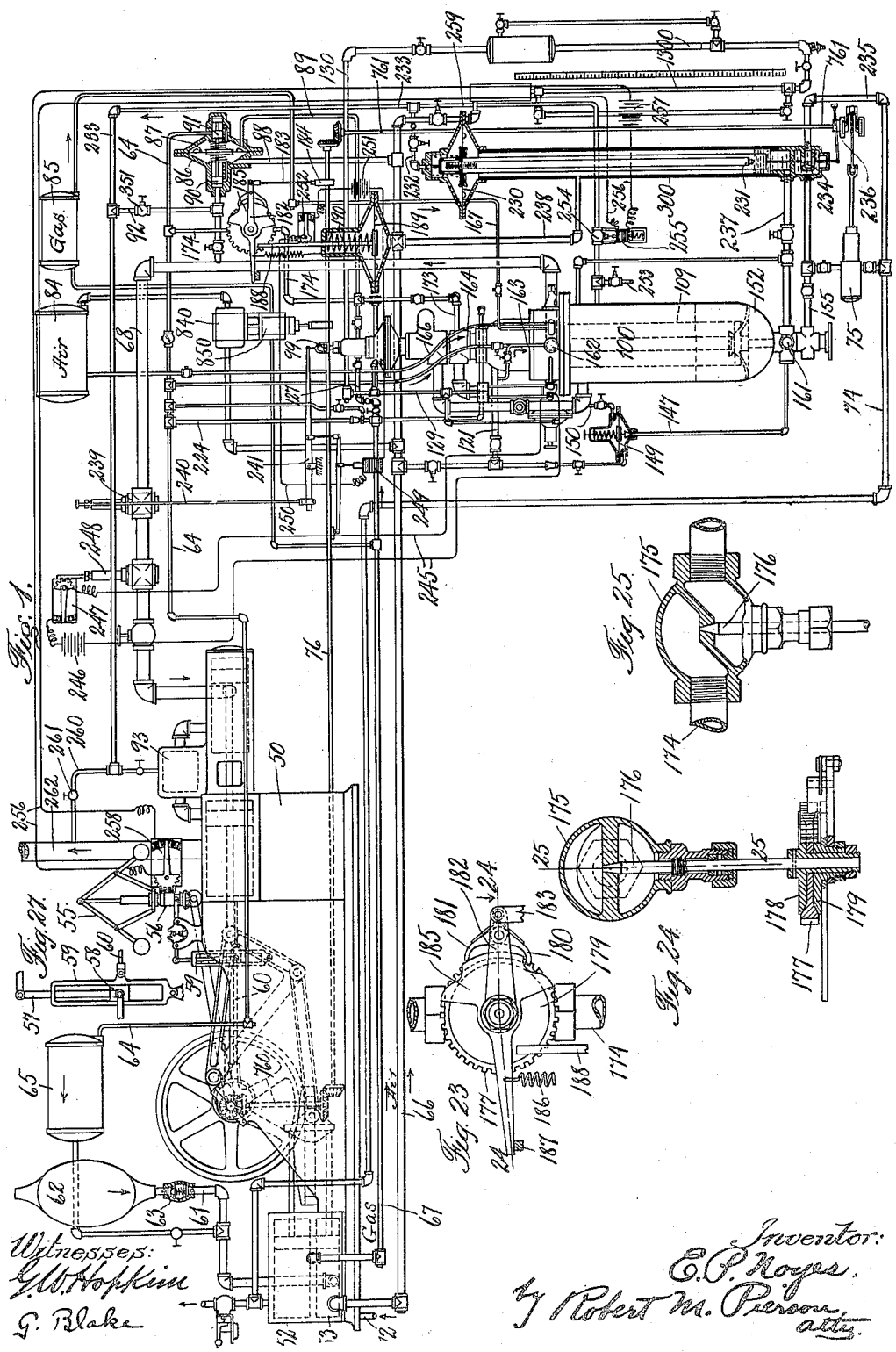

E. P. NOYES.
CONSTANT PRESSURE INTERNAL COMBUSTION APPARATUS.
APPLICATION FILED AUG. 26, 1905.
987,160.
Patented Mar. 21, 1911.
6 SHEETS—SHEET 2.
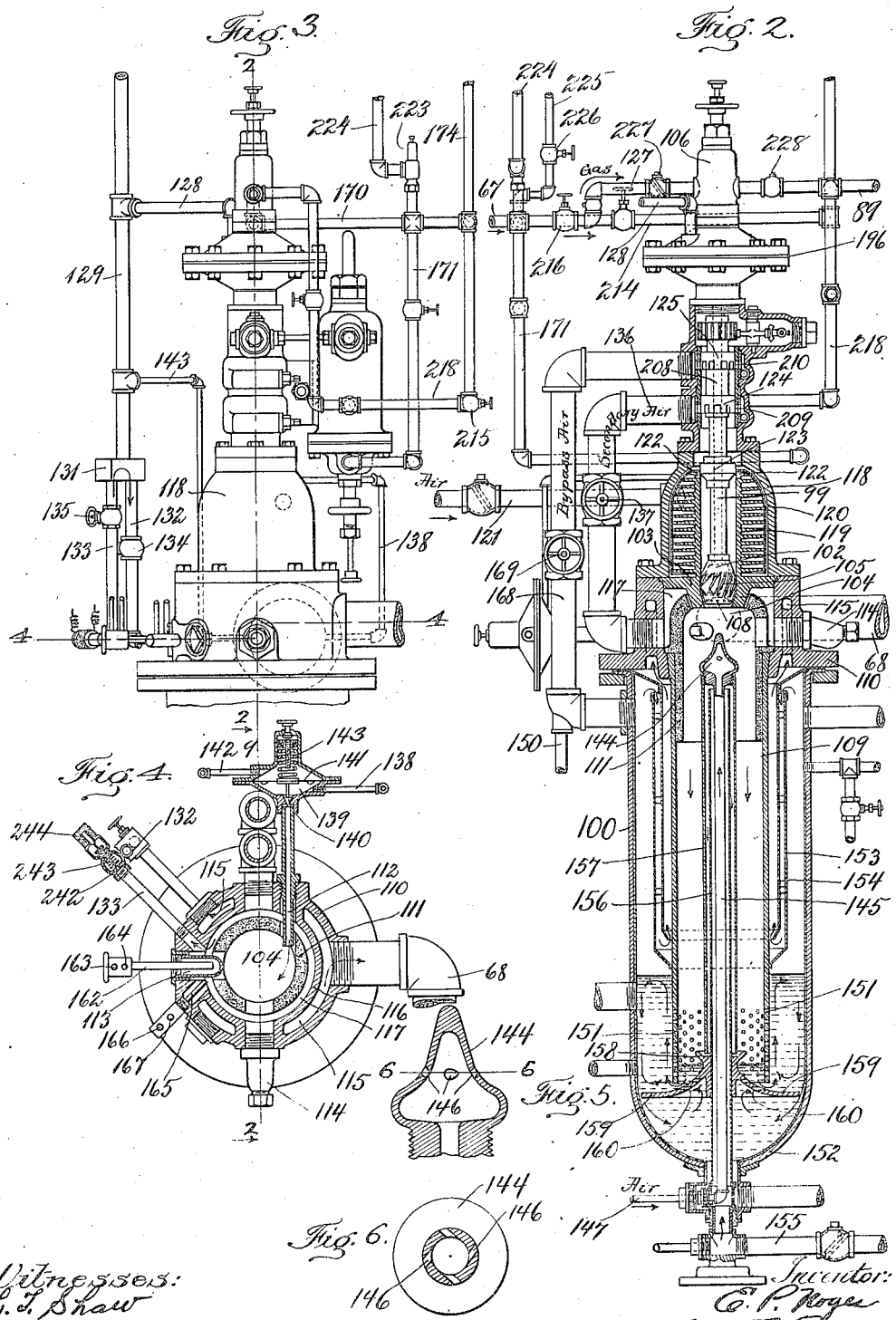

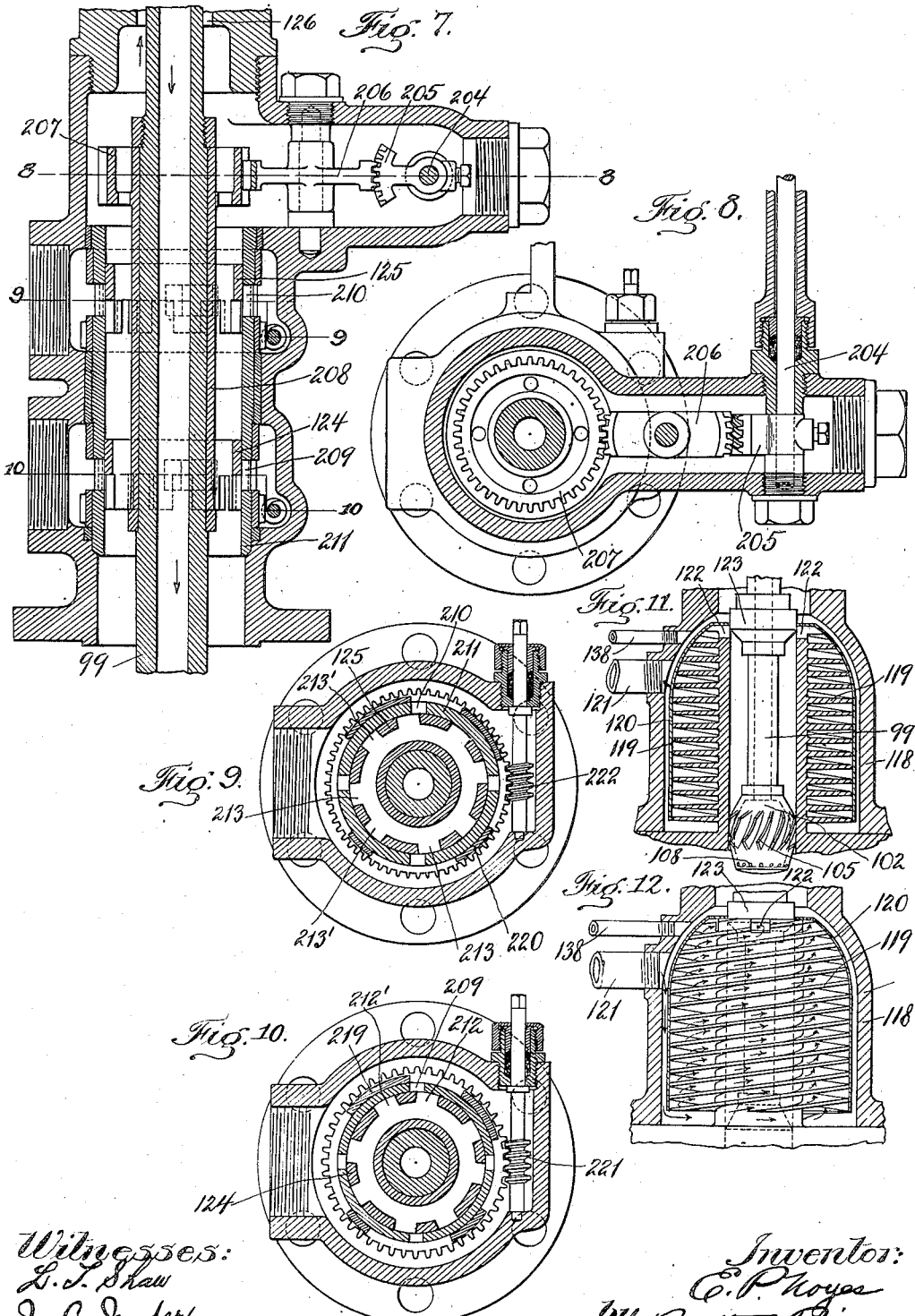

E. P. NOYES.
CONSTANT PRESSURE INTERNAL COMBUSTION APPARATUS.
APPLICATION FILED AUG. 26, 1905.
987,160.
Patented Mar. 21, 1911.
6 SHEETS—SHEET 4.
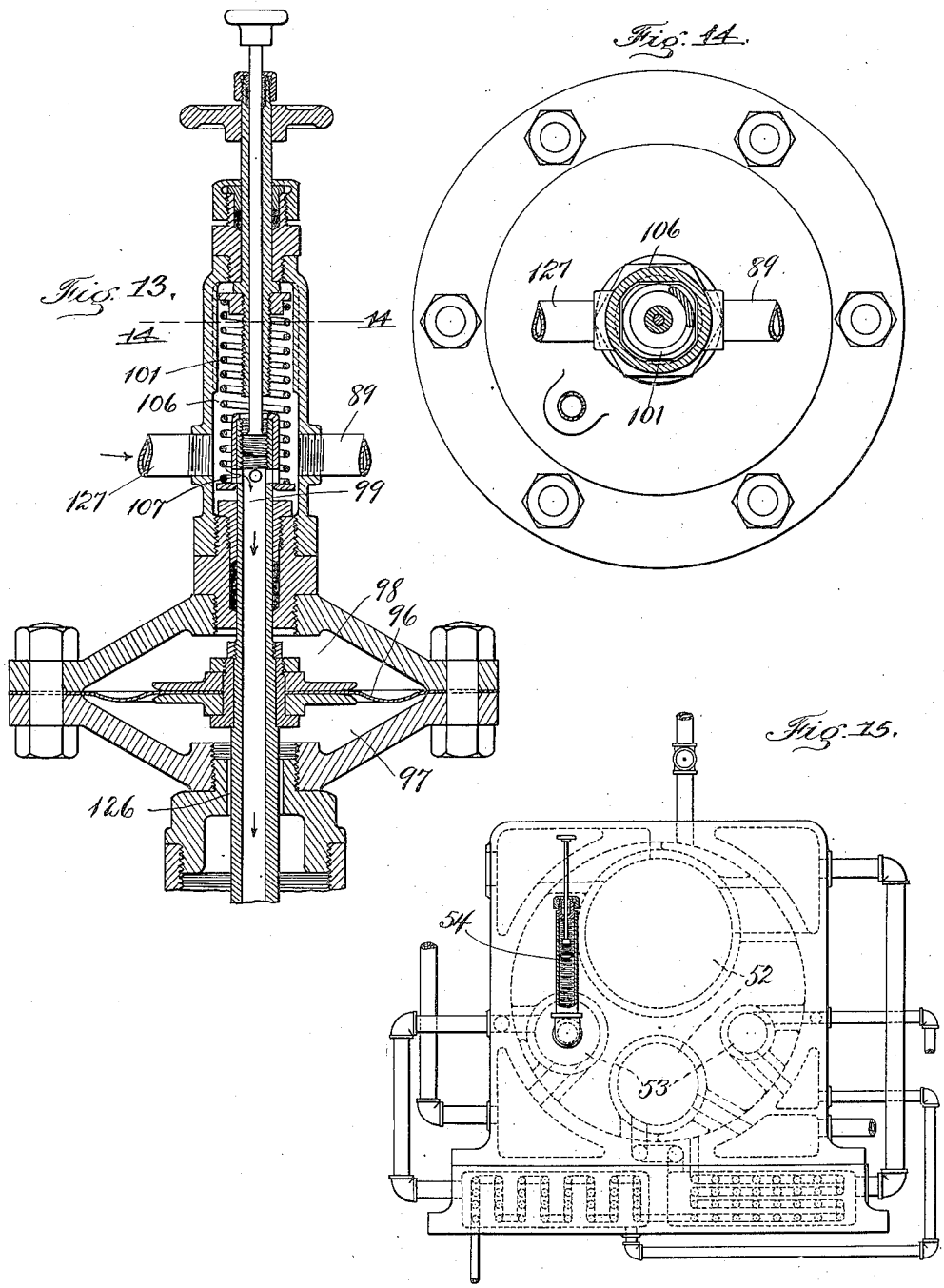

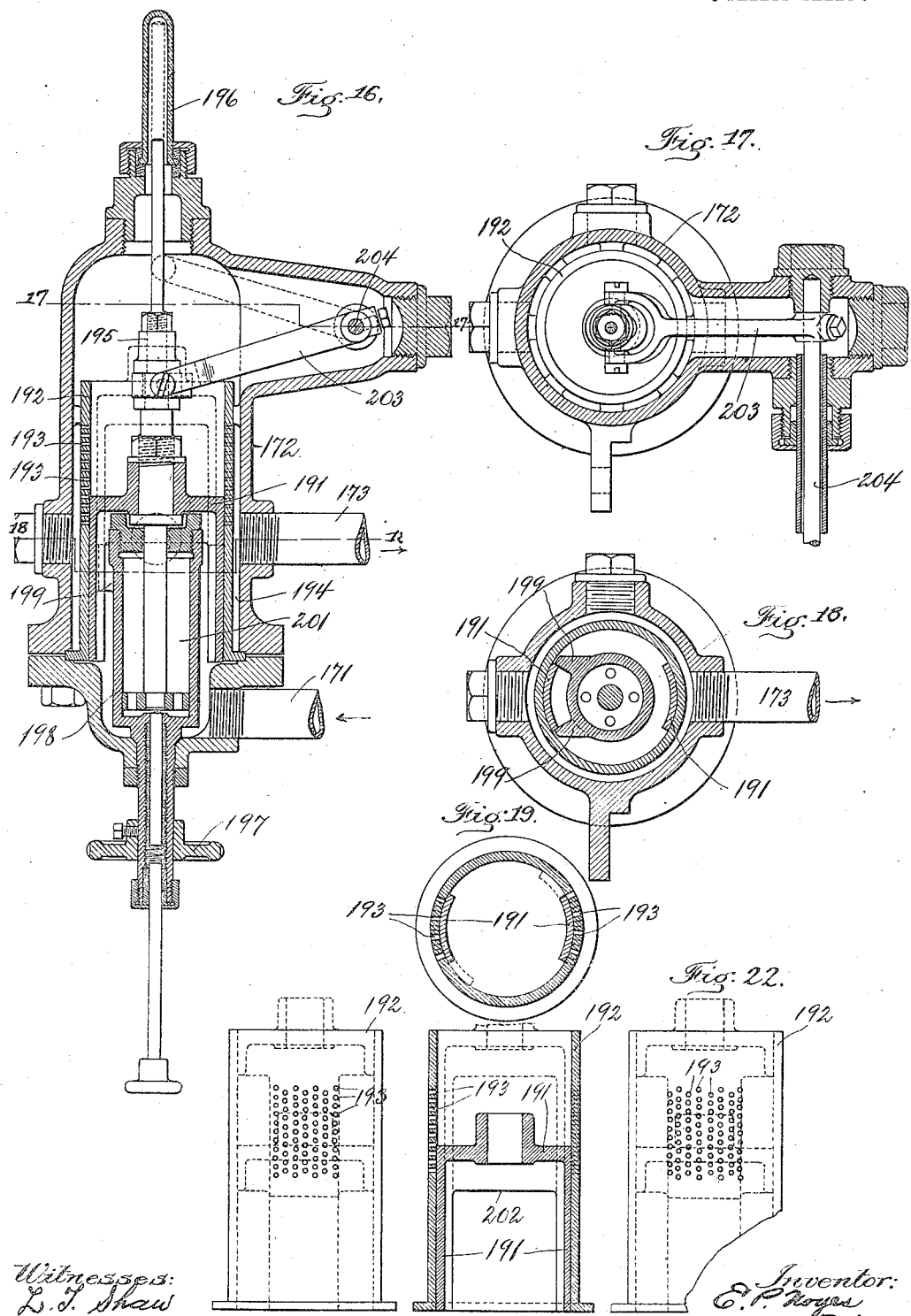

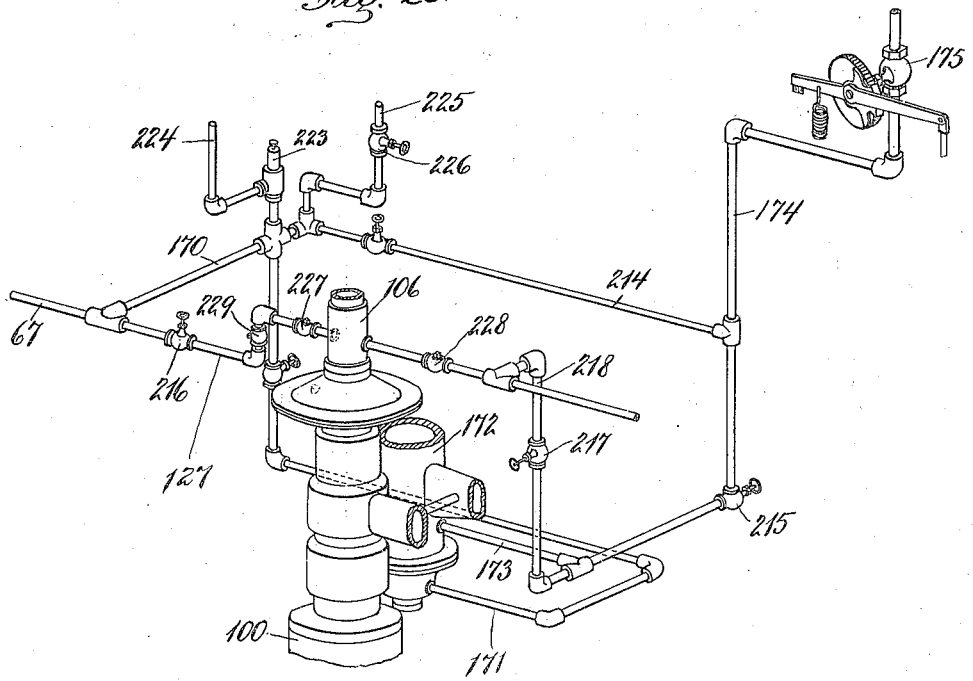

UNITED STATES PATENT OFFICE.

EDWARD P. NOYES, OF WINCHESTER, MASSACHUSETTS.

CONSTANT-PRESSURE INTERNAL-COMBUSTION APPARATUS.

987,160.

Specification of Letters Patent. Patented Mar. 21, 1911.

Application filed August 26, 1905. Serial No. 275,861.

*To all whom it may concern:*

Be it known that I, EDWARD P. NOYES, a citizen of the United States, residing at Winchester, in the county of Middlesex and State of Massachusetts, have invented certain new and useful Improvements in Constant-Pressure Internal-Combustion Apparatus, of which the following specification and accompanying drawings illustrate the invention in a form which I now regard as the best out of the various forms in which it may be embodied.

This invention relates to apparatus for converting the thermal energy of fuel into work and particularly to engines operating on the "Joule" cycle of combustion under constant pressure.

The main elements belonging to apparatus of the class to which the invention principally relates are devices, such as air and gas compressors, for pumping air and fuel up to the maximum pressure of the system, a generator comprising a burner for burning the air and gas continuously, and a cooling-chamber containing a pool or spray of water in which the gases of combustion are quenched before entering the engine cylinder and their high-temperature heat embodied in a more useful form in the steam which, together with the gases of combustion, passes from the generator into the engine and is there employed expansively on the piston or other moving part of the motor.

Other desirable features are suitable regulating devices for maintaining the air and gas for the burner in combustible proportions, and suitable automatic devices for maintaining the water-level in the generator under control.

The present invention deals with the following features in connection with such a system. First, the attainment and regulation of superheat, both by contact of the mixed motive-fluid with hot surfaces and by by-passing unquenched gases around the cooling-chamber into the engine-bound fluids. Secondly, the construction and regulation of the generator or generators for burning the air and gas and vaporizing water with the products of combustion, with special reference to (*a*) ignition and the maintenance of a pilot flame, (*b*) adequate preheating of fluids and mixture thereof before and during inflammation, (*c*) durability and removability of parts, (*d*) deposit of sediment from the cooling chamber, (*e*) regulation by release of excess gas to the suction of the gas-compressor and by-passing of excess air around the burner, (*f*) maintenance of velocities of flow at the burner during changes in the pressure, (*g*) water spray in generator. Thirdly, means for providing an outlet from the combustion - chamber at times when there is no out-draft of motive-fluid to the engine.

By the individual and conjoint operation of the several devices comprised in the above - recited features of my invention a power system is provided which is in a high degree automatic and economical in its operation, and is adapted for service under widely varying conditions of load.

Of the accompanying drawings, Figure 1 represents a diagrammatic view of a power-generating apparatus embodying my invention. Fig. 2 represents a vertical section of the generator. Fig. 3 represents a rear view of the upper portion thereof. Fig. 4 represents a section on the line 4—4 of Fig. 3. Fig. 5 represents a view of the axial air-nozzle of said generator. Fig. 6 represents a section on the line 6—6 of Fig. 5. Fig. 7 represents an axial section of the valves for controlling secondary and by-pass air in this generator. Figs. 8, 9, and 10 represent sections on the correspondingly numbered lines of Fig. 7. Figs. 11 and 12 represent respectively a section and an elevation of the spiral air-channel in the head of this generator. Fig. 13 represents a section of the parts of the generator head above Fig. 7. Fig. 14 represents a section on the line 14—14 of Fig. 13. Fig. 15 represents a rear elevation of the compressors. Fig. 16 represents a section of the device controlled by gas release for by-passing air. Figs. 17 and 18 represent sections on the correspondingly numbered lines of Fig. 16. Fig. 19 represents a horizontal section taken above the plane of Fig. 18. Figs. 20, 21, and 22 are views of the piston and its cylinder in this device. Fig. 23 is an elevation of the gas release valve. Fig. 24 is a section on the line 24—24 of Fig. 23. Fig. 25 is a section on the line 25—25 of Fig. 24. Fig. 26 is a perspective view of the piping connected with the head of the generator. Fig. 27 (Sheet 1) represents a detail of the governor.

The same reference characters indicate the same parts in all the figures.

I will first give a general description of the principal working elements of the apparatus.

50 is a compound-engine of the steam-engine type for receiving the mixed motive fluid composed of steam and products of combustion. This engine is direct-connected to the air and gas-compressors which are represented at 52, 53 and are preferably stage compressors. The engine has a governor 55 of the centrifugal type for controlling its cut-off according to speed, the sleeve thereof connecting through levers 56 and a link 57 with a sliding block 58 in a rock-lever 59 connected with the valve-rod 60, the distance of said block from the pivot of the rock lever determining the travel and cut-off of the engine slide-valve. Gas is supplied to the suction of the gas-compressor through a pipe 61 in which is a flexible gas bag 62 and a backwardly-closing check-valve 63.

64 is a release-pipe containing a reservoir-chamber 65 and connecting with the gas suction-pipe 61 for conducting released gas from several devices hereinafter described back to the gas-compressor.

66 and 67 are respectively the compressed-air and gas conduits leading from the compressors to the generators.

100 is the generator for providing a motive fluid composed of steam and products of combustion which passes by way of pipe 68 to the engine 50.

Water is supplied by a pipe 72 seen in the upper left-hand corner of Fig. 1, first to the jackets of the compressors and also by way of pipe 74 to the suction of a pump 75 which supplies the cooling-chamber of the generator and is driven by shafts 76, 760, 761 and suitable gearing from the engine shaft.

300 is an automatic level-controller for maintaining the feed-water in the cooling-chamber of generator 100 at a predetermined level. Pressure equality in the air- and gas-conduits is maintained by a pressure-balance mechanism 86 receiving the air and gas pressures on opposite sides of a diaphragm 87 through pipes 88, 89 and having piston-valves 90, 91 for releasing air through pipe 92 to the engine-receiver 93 and releasing gas to the release-pipe 64.

One of the important regulating features in the generator is what I term the "initial-terminal" valve, or, more briefly, the I—T valve. This is a resistance-valve mechanism placed in the air and gas paths to the generator and controlled by the differential action of the pressures on either side of it, these pressures acting on opposite sides of a diaphragm, which also receives the pressure of a spring in aid of the terminal-pressure, so that the initial pressure always exceeds the terminal pressure during fluid-flow by a difference depending upon the pressure of the spring. Such valve has a useful regulating function, its principal uses being, first to maintain velocities of flow of the combustion-fluids just prior to the point of ignition and thus prevent back-firing or back flow and secure an efficient mixture of the air and gas and, secondly to afford a means for regulating both the air and gas and insuring proportionateness of the relative quantities going to the burner, by means of the pressure of a single one of these fluids acting on one side of the diaphragm and the terminal-pressure of the fluid or fluids before or after combustion acting on the opposite side. This valve is not broadly claimed herein, being made the subject of a separate Patent No. 868,358, but it receives useful applications in the present apparatus. Its main application to the generator 100 is illustrated principally in Figs. 2, 7, and 13.

96 is a diaphragm receiving on its lower side in chamber 97, through passages later described, the pressure of the air initial to the valves controlled by the diaphragm, and on its upper side in chamber 98 the pressure of the burned fluids terminal to these valves. The diaphragm is attached to a hollow spindle 99 passing through a stuffing-box in the top of the diaphragm-casing and receiving the pressure of a downwardly-acting spring 101 in aid of the terminal pressure. At its lower end spindle 99 carries a cone-valve 102 coöperating with a conical seat in a cast piece 103 and controlling the primary flow of both air and gas into the combustion-chamber 104 immediately below it. The primary air flows around the outside of this valve and is given a rotary whirl or twist by spiral vanes 105 on the valve, while the gas from chamber 106 containing the spring 101 enters the interior of spindle 99 through holes 107 in the spindle and spring-saddle, issues into the combustion-chamber 104 through a circumferential series of holes 108 formed in the seating face of the cone-valve, near its lower edge. The gas thus mixes with the air immediately before entrance into the combustion-chamber and the resistance imposed by the valve to the combined flow is that afforded by the lower lip of the valve in conjunction with the valve-seat. This resistance is that due to the pressure of the spring 101 and no matter what the pressure of the fluids, whether high or low, this resistance is always sustained and serves to maintain a velocity of flow at the point of ignition. It will be recognized that the parts immediately connected with the upper end of combustion-chamber 104 for supplying thereto and mixing the combustion fluids (air and gas in this case), constitute the burner. Secondary air is also provided at the burner by several agencies presently enumerated.

The lower part of the combustion-chamber is constituted by a combustion-tube 109 whose upper end has a tight taper fit in the lower end of a cast piece 110 and is removable upwardly therefrom. Within it is loosely fitted a refractory liner 111 having three holes, best seen in Fig. 4, above the zone of the combustion-tube joint for the reception of a tangential air-nozzle 112, an igniter-thimble 113, and for visual aliment with a glazed peep-hole-tube 114 whereby the combustion may be observed. The outer space within the casing 110 is a corridor 115 forming the upper end of the passage for outgoing mixed steam and products of combustion and separated by a partition 116 from the inner space 117 between the liner and the casing which receives secondary air and communicates with the combustion-chamber 104 through and over the liner 111. This corridor serves to jacket and cool the combustion-chamber, preheat the secondary air and superheat the outgoing steam. It is crossed by several cored passages or bridges for peep-hole-tube, igniter, secondary-air pipe, etc., and from it leads the pipe 68 for supplying motive-mixture to the engine 50. It will be observed that the corridor 115 is separated from the secondary-air space 117 and the interior of the combustion-chamber by the described partition and taper joint between combustion-tube 109 and casting 110. This construction allows for the entrance of peep-hole-tube, igniter, etc., above the joint of the combustion-tube, whereby this joint is preserved and rendered tight in the presence of high heat. The casting 103 is also fitted with a taper-joint to a seat on the upper part of casting 110 and is held in place by a dome-shaped piece 118 bolted thereto.

On the exterior of the upper hub portion of piece 103 are cast helical ribs or vanes 119 forming a replicate air-passage for preheating the primary air, not by jacketing the combustion-chamber, but wholly by upward conduction of heat from the combustion-chamber, and serving to cool the seat of cone-valve 102. Over the ribbed part is fitted a hat-shaped casing 120 separated by a space from the dome-shaped piece 118 and with lower edge raised from the floor of the dome-chamber.

Air for both primary and secondary flows enters the dome-chamber 118 on the outside of hat 120 through a pipe 121 branching from the air-conduit 66. For the primary flow it passes underneath the lower edge of hat 120 upwardly between the spiral vanes, and into the axial passage surrounding spindle 99 through holes 122, thence past the cone-valve 102 into the combustion-chamber. From this axial passage it is prevented from passing upwardly by a piston 123 fitting in the bore of piece 103. Secondary air, however, passes upwardly from pipe 121 around the hat 120, through the hollow interiors of two piston-valves 124, 125 (see Fig. 7) and through a constricted passage 126 (Figs. 7 and 13) to the lower diaphragm-chamber 97, affording the initial air pressure on the under side of diaphragm 106. The narrowness of this passage 126 cushions the movements of the diaphragm during changes in pressure.

Gas is supplied to the chamber 106 and thence to the interior of valve-spindle 99 through a pipe 127, branching from the gas-conduit 67. The piston-valves 124, 125 on the valve-spindle control respectively secondary and by-pass air, as more fully hereinafter described. Terminal pressure is supplied to the chamber 98 above the diaphragm through a pipe 128 branching from a pipe 129 which connects with the terminal chamber of the generator beyond the water-pot. This pipe 129 has an extension 130 leading to the U-tube 1300 hereinafter described. The connections of pipe 129 with the terminal spaces are best seen in Figs. 3 and 4. Its lower end joins a fitting 131 connecting by two branches 132, 133 containing stop-valves 134, 135 with the steam-and-gases corridor 115 and with the combustion-chamber 104 via secondary air-space 117, respectively. Thus by manipulating the stop-valves 134, 135, pipe 129 may receive either the terminal-pressure of the combustion-chamber or the "sub-terminal" pressure of the cooling-chamber. The terminal and sub-terminal pressures differ by the height of the column of water in the cooling-chamber, as later described. The pipes 132, 133 and fitting 131 also serve as a by-pass for superheating the engine-bound fluids with unquenched gases, as more fully hereinafter described.

Secondary air flows under control of piston-valve 124 and the I—T diaphragm 96 through a pipe 136 containing stop-valve 137 into the space 117 surrounding liner 111 and thence through and over the edge of said liner into the combustion-chamber, where it may participate in combustion, being later used expansively in the engine. A portion of this flow envelops the igniter-thimble 113 (Fig. 4) and aids in keeping the latter cool during normal running. Secondary air also enters the combustion-chamber through a tangential nozzle 112 and creates a whirl which promotes mixture of the air and gas. This air is supplied by pipe 138 (Figs. 3, 4, 11) branching from the dome-chamber 118 and enters the nozzle from a diaphragm-chamber 139 under I—T control by a valve 140 actuated by a diaphragm 141. On its outer side this diaphragm 141 receives terminal fluid-pressure through a branch 143 from pipe 129 and the pressure of a spring 142 which is adjusted so that the differential for this tangential flow approximates that for the primary air flow past cone-valve 102 and the secondary flow through pipe 136. This tangent differential is preferably, however, slightly greater at starting, so that, since the flow will follow the path of least resistance, the flow may all be past the cone-valve during minimum outdraft or outlet from the generator, the tangential flow adding itself as the volume of flow past the cone valve increases. The attainment of this action is a matter of the relation of diaphragm areas and spring pressures.

A third supply of combustion fluid, namely secondary air, is provided from a refractory nozzle 144 below the cone-valve through an axial air-pipe 145, supported from below. This nozzle is concavely coned and flared and provided with tangential air-outlets 146 (Figs. 5 and 6), inclined in the opposite direction to the vanes 105 on the cone-valve. This nozzle rebuffs the primary air-and-gas flow and creates a counter whirl, thus promoting mixture and complete combustion within a limited space. The axial tube 145 is a continuation of an air-pipe 147 branching from initial-air pipe 121 connected with the air-conduit 66, and I—T-controlled by a diaphragm 149 receiving the initial air-pressure on its lower side and on its upper side the pressure of a spring and the sub-terminal pressure of the generator through pipe 150 branching from the interior of said generator. The differential for this control also approximates that of the main cone-valve and the tangential diaphragm 141, but may differ slightly from both, so that the three air flows operate in succession at starting. As thus illustrated, the combustion fluid supplied through nozzle 144 is air, but my invention is not limited in respect to the character of the combustion fluids in the counter currents.

Products of combustion passing downwardly through combustion-tube 109 issue through a series of holes 151 in its lower portion into the cooling-chamber or pot 152, in which is maintained a small body of water which continuously vaporizes, reducing the high temperature of the gases and creating a body of steam which passes on with said products into the engine-pipe 68. In its journey from the cooling-chamber to the engine-pipe the mixed fluid traverses a labyrinthine passage formed by two concentric sleeves or casings 153, 154 surrounding the combustion-tube 109, the outer sleeve 153 being open at its upper end to the space above the water-pot and embracing the tube closely at its lower end, while the inner sleeve 154 is separated from the tube at its lower end and communicates at its upper end with corridor 116, from which engine-pipe 68 is the outlet. By means of this construction a large amount of superheating surface is provided and superheating of the steam is gradual and progressive, the outer one of the three steam-and-gas envelops jacketing the middle and inner ones, while the middle one jackets the inner one and the inner one jackets the combustion-tube, the transmission of heat outwardly being uniform and radiation from the generator-casing at a minimum.

Water is supplied by the pump 75 to the cooling-chamber 152 and its level maintained at a predetermined point by the level-controller 300, hereinafter described. The pump delivers through pipe 155 to a jacketing pipe 156 surrounding the axial air-pipe 145 and serving to cool the portions thereof within the combustion-chamber, the water flowing up between pipes 145 and 156 and down between pipe 156 and the concentric pipe 157 into the combustion-tube interior, the final exit thereto being through a shallow seal 158 designed to exclude gases. The cup containing this water-seal also acts as a circular spoon-shaped deflector, throwing the injected water in all directions and upwardly in a thin film against the down-flowing gases. The lip of the said deflector is shown as being above the normal level of the water in the combustion-tube. The upwardly-thrown water film, vaporizing in larger or smaller degree, begins the absorption of the heat of the burned gases. Any water not vaporized falls down and serves to supply the loss caused by the evaporation of the body of water in the cooling-chamber.

The deflector-lip is preferably not far above the water-level at the bottom of the combustion-tube, but, obviously, it may be placed at any desired distance above the water-level, to suit special conditions, and furthermore the upward spurt and splash of the water-film will reach more or less toward the upper region of first combustion, according to the volume of water being injected by the in-forcing pump and according to the size of the orifice between the lower tube-lip of tube 157 and the deflector and according to the precise cup-shape given to said deflector. With certain combustion-chamber and fuel conditions, the combustion may be very rapid and quickly complete. With other conditions more combustion-chamber space and more time for combustion may be required. The water spurt will be adapted to these conditions as they exist in any case, the object being to begin the absorption of heat by water as early as is practicable without making combustion incomplete and without unfavorably affecting the final superheat. This heat absorption by water film reduces temperatures desirably at an early point and increases the durability of all adjacent parts. It also promotes delicacy and completeness of temperature regulation. The pipe 156 supports a circular water-baffle 159 separated from the lower edge of the combustion-tube and from the wall of the cooling-chamber casing, and having apertures 160 opposite the passage between it and the edge of the combustion-tube. The space below this baffle is comparatively quiet and serves to collect scale and other foreign matter, which may be blown off through an outlet 161 (Fig. 1). The direction of water-circulation is indicated by arrows in Fig. 2.

Ignition is effected in the combustion-chamber 104 by heating the reëntrant igniter-thimble 113 from the outside by means of a small burner 162 with a blast of pressure-air from the air-pipe 121 received through branch 163 (Fig. 1) and gas received from the release-pipe 64 through branch 164, and when the igniter-thimble is hot, directing against it from a burner 165 placed diagonally as shown in Fig. 4 a blast of air-and-gas mixture at super-initial pressure received from the reservoirs 84, 85 through branches 166, 167. This diagonal flow, becoming inflamed by the hot igniter-thimble, passes into the middle of the combustion-chamber and ignites the main flow therein. After ignition has been accomplished the external heating of the igniter-thimble 113 by means of burner 162 may be discontinued. The flame from diagonal burner 166 is continued during normal running as a pilot flame, serving to re-ignite the main flame after any suspension of the main flow which may occur. The described construction has the advantage of allowing the ignition-thimble to be remote from the region of greatest heat intensity and its durability thereby greatly increased, and also promotes a non-explosive ignition which would be difficult of prevention with a short igniter in the absence of the diagonal flow penetrating to the interior of the combustion-chamber. It is remarked that the by-pass-pipe 168, whose main function will be later described, performs a useful office in connection with the ignition of the main current of combustible, for by the opening of its stop-valve 169 a portion of the air-flow supplied by the air-compressor may be at first diverted around the main burner, thus avoiding in part the cooling effect which the main flow of air and gas would have upon the igniter-thimble 113 before this flow has become ignited.

I will next describe the means provided for preserving the desired quantity-ratio of air and gas participating in combustion at the burner. The procedure here adopted is that of causing the air and gas compressors to compress fluids in excess of the ordinary demands of the engine. The excess may at first go to suitable reservoirs (not shown) but after these are full and the pressure still increases, provision is made for diverting the excess quantities of both air and gas from the burner. Excess gas is released and returned to the suction side of the compressor, while excess air in proportion to the quantity of gas released is by-passed around the burner into the engine-pipe. As most clearly seen in Fig. 26, gas from the conduit 67 passes to the head of generator 100 through branch 127 before mentioned. That portion which is to be released passes by way of branch 170 and a continuation 171 to a casing 172 containing a floating piston for metering the released gas, and thence by pipes 173, 174 to a gas release-valve 175 shown also in Figs. 1, 23, 24, and 25. The release-branch 174 connects with release-conduit 64, as seen in Fig. 1. The release-valve mechanism includes a needle-valve 176 having a threaded stem and on its outer end a ratchet-wheel 177 mounted between two friction-plates 178, 179, the former fixed to the valve-spindle. Rotary movement is imparted to the valve-spindle by either one of two oppositely-acting pawls 180, 181, the former tending to open the valve and the latter to close it. These pawls are mounted on an arm 182 oscillated through link 183 by an eccentric 184 on the shaft 76. The engagement of the pawls with the toothed-wheel is controlled by a pawl-lifter or cam 185 loose on the valve-spindle and having an arm held by a spring 186 against a fixed stop 187. This arm is abutted by a rod 188 actuated by a diaphragm 189 receiving on its under side the pressure of the air-conduit 66 and on its upper side the pressure of the atmosphere and of a spring 190. It will be seen that when the pressure in the air-conduit, which is equal to that in the gas-conduit by operation of pressure-balance diaphragm 87, has reached a predetermined point, the motion of the upper pawl 181 will tend to open the release-valve and release a portion of the compressed gas back to the suction-side of the gas compressor. Hence, through a decrease in the intensity of combustion, a limitation is imposed on the further rise of pressures.

The gas entering the casing 172 reaches the under side of a piston 191 having two depending legs and mounted to slide in a liner 192 having two groups of perforations 193 connecting its interior with an outlet-space 194 surrounding it and communicating with pipe 173. The piston is mounted on a vertically-movable stem 195 whose movements may be observed through a glass cap 196. The piston is capable of rotation by hand on this spindle through a hand-wheel 197 attached to a hub 198 which has wings 199 commanding the rotation of the piston but permitting its vertical movement. Said hub contains a dash-pot 201 for cushioning the vertical movement of the piston. Rotation of the piston uncovers first a row of holes in one of the groups and then one in the other group and so on, and the total number of rows uncovered by the horizontal movement determines the extent of vertical movement of the piston necessary in order that its horizontal edge 202 (Fig. 21) shall uncover any predetermined total area of holes. The gas released past valve 175, first passing underneath the piston 191, raises said piston until the latter uncovers an area of holes 193 adequate to pass the volume of released gas without greatly reducing its pressure. The piston therefore actually floats upon the released gas, and it is an accurate meter of the volume of gas released, the piston standing higher for a larger release and lower for a smaller release.

Piston-rod 195 connects with a rock-lever 203 on a rock-shaft 204 which enters the main head of the generator 100 as seen in Figs. 7, 8 and there carries a spiral gear-segment 205 engaging a complementary segment on an intermediate gear-member 206. The latter has spur-teeth engaging those of a gear 207. This latter is attached to the valves 124, 125 which are on one valve-member 208 movable axially with the cone-valve spindle 99 and rotatable thereon. It is apparent that the vertical position of the piston 191 determines the rotary position of the valves 124, 125. These latter have crown ports or apertures and intervening teeth or solid portions on their lower edges, and they control respectively ports or apertures 209, 210 in a liner or sleeve 211 fitted within the generator head. These ports 209, 210 coincide in vertical alinement, but the solid portions or teeth of the valve 125 are alined with the spaces or apertures of valve 124 and vice versa. The result is that any rotatory movement of the valve-member 208 opens the lower or secondary air-ports 209 by as much as it closes the upper or by-pass air-ports 210 and vice versa, the total area remaining the same, so that no variation in the resistance to the total air-flow controlled by these valves is accomplished by rotating them. The resistance is, however, varied by the vertical movement of spindle 99 under control of the I—T diaphragm 96, so that the flow controlled by these valves 124, 125 shall have its resistance varied conformably with the flow past cone-valve 102. Since rotation of the valves 124, 125 is effected by the piston 191, it is evident that the amount of air by-passed around the burner by pipe 168, through the upper valve 125, depends upon the amount of gas released past valve 175. By rotatory adjustment of the piston 191 through hand-wheel 197 the by-passed air may be made equal in volume to the released gas or may bear any desired proportion thereto.

Provision is made for an alternative operation of the by-pass and release mechanism with the same apparatus. In Figs. 9 and 10 it will be observed that the valves 124, 125 each have eight ports 212, 212′, 213, 213′, while the liner 211 has only four ports 209 or 210 in each set. The number of teeth in gear 207 is in a suitable ratio such that by engaging said gear in a new relation with the intermediate gear-member 206 the ports 212′ and 213′ may be substituted in action for the ports 212, 213. The same rotatory movement of the valve-member 208 imparted by piston 191 will then conversely operate on the secondary-air and by-pass ports 209 210, closing by-pass ports, where formerly it opened them and vice versa. When this set is given to the valve-member the gas-release is made to take a different course, going by pipe 170 and a pipe 214 (Fig. 26) to the release-pipe 174 and hence not encountering the piston 191. Under these circumstances a stop-valve 215 in the release-conduit and a stop-valve 216 in the gas-branch 127 going to the generator are closed, and a stop-valve 217 in a branch 218 from the outlet of the piston-casing 172 to the gas-chamber 106 in the generator-head is opened. The piston 191 then floats on burner-gas instead of released-gas, and as more gas goes to the burner and the piston rises the by-pass-valve 125 closes and diverts less air around the burner, and vice versa.

In Figs. 7, 9, and 10, on the outside of the liner 211 are seen rings 219, 220, having apertures and solid portions controlling the ports 209, 210 and having gear-teeth engaged by tangent screws 221, 222 accessible from the outside. Rotation of these rings cuts off the four ports in each set, one at a time. The function of the rings is to regulate the quantity of air going by the respective ports, or the proportion of the total port-area available for regulation by the respective valves. Such adjustment may be required to apportion the air between said valves and the cone-valve or to apportion the air for different qualities of gas. For this purpose it is not practicable to control these ports by throttling them, either laterally or vertically, because both lateral and vertical port-dimensions have been monopolized by the valves 124, 125 for performing their function, and also because any partial closing of the ports would interpose its own resistance, which, if less than that of the I—T throttling, would be ineffective, and if more, would become an arbitrary and uncontrollable usurpation of the function of the I—T valves.

A-release is provided from the gas-branch 170 (Fig. 26) by way of safety-valve 223 and release-branch 224 to the release-conduit 64, this valve being preferably set to operate at a higher pressure than the release-mechanism 189, 175 and acting in emergencies. It might, however, take the place of valve 175. 225 is a further release-branch controlled by stop-valve 226 and adapted for release of gas in starting, as hereinafter described. Suitable check-valves 227, 228 opening toward the generator 100 are placed in the gas-pipes 127 and 218 to prevent back-flow. In the pipe 127 I have also shown a reversely-operating check-valve 229, that is, one closing in the direction of gas-flow, but so hung as to be closed only by an abnormal rush of gas, for the purpose of shutting off the gas in case of sudden release of pressure in the generator.

Water-level is controlled in generator 100 by level-controller 300, comprising a diaphragm 230 having chambers above and below it in which the pressure is equalized when the water-level is below the inlet-end of a dip-tube 231 carried by the diaphragm. A release-branch 232 connected with a vent pipe 233 leading to the receiver 93 of the engine 50 affords a constant small leakage from the upper diaphragm-chamber. When the inlet of the dip-tube is sealed, pressure in the upper diaphragm-chamber is reduced by leakage through pipe 232 and the pressure underneath the diaphragm raises the latter and opens a by-pass-valve 234 controlling a by-pass conduit 235 which connects the delivery side of the pump 75 with its suction-side. Feeding of water to the generator 100 and level-controller 300 therefore ceases or diminishes until the level is reduced below the inlet end of the dip-tube.

Equality of water-levels in the controller 300 and generator 100 would require, in addition to the water-connection 237 between their lower portions, a gas-connection between the upper space of the controller above the water and the sub-terminal space of the generator. It will be noted that no such upper connection exists. I have instead made a U out of generator and level controller and established the initial air-pressure from air-conduit 66 through the branch 238 on top of the water-leg in controller 300. On the water-leg in the generator cooling-chamber exists the sub-terminal pressure, which is less than the initial-pressure by virtue of the resistances of the I—T valves and of the water-column in the cooling-chamber 152 which the gases have to displace. The level therefore stands higher in the cooling-chamber than in the controller. During the feeding of cooling-chamber by pump 75 the water-level rises parallel in the generator and controller at different heights until the leg in the controller reaches and covers the inlet of dip-tube 231. It can then rise no higher in the controller. It may, however, vary in the cooling-chamber 152 according to the differential between initial and terminal pressures. That is to say, if the resistance of the I—T valve, for example, be increased by increasing the pressure of spring 101, the drop from initial to sub-terminal pressure will increase and the water-level will rise in the cooling-chamber. As the height of water in said chamber controls the amount of outer surface of the combustion-tube 109 available for superheating the stem in the motive mixture, it will be apparent that the described combination affords a simple means for varying superheat by varying the resistance or differential in the generator. Means for doing this automatically and thus controlling surface superheat is provided by the thermostat 239 in the engine-pipe 68 (Fig. 1) connecting by a rod 240 attached to a pivoted lever 241 which bears on the upper end of I—T spindle 99. Increase in temperature of the engine-bound fluid beyond a predetermined point exerts a downward pressure on the I—T valve-spindle, thus increasing the pressure-drop through the generator and raising the water-level in cooling-chamber 152, so as to decrease the super-heating surface and avoid further rise of superheat.

I have shown a further means of varying the amount of superheat by by-passing unquenched gases from the combustion-chamber around the body of cooling-water into the engine-bound flow. For this purpose is utilized the loop 132, 131, 133, seen in Figs. 3 and 4, connecting the interior of the combustion-chamber 104 with the corridor 115. In this conduit is located a refractory valve 242 suited to withstand a high heat and held closed by a spring 243. This by-pass valve is controlled by an electric solenoid 244 having in its circuit 245 (Fig. 1) a battery 246 and a rheostat 247, whose arm is adjustable by a second thermostat 248 in the engine-pipe. Increase in temperature of the engine-fluid beyond a predetermined point increases the resistance in the solenoid-circuit and allows the by-pass valve 243 to approach its seat and decrease the quantity of gases passing unquenched around the cooling-chamber. This device may operate concurrently with the thermostat 239 controlling surface superheat, the by-pass superheat assuming control when high temperatures are desired and the surface superheat at lower temperatures, or one may be disconnected when the other is in operation. It has thus been shown that superheat of engine-bound fluids may be varied and controlled by thermostatic means resulting in water-level variation in the cooling-chamber. This change of level (a) varies the superheating surface, and (b) permits, at times, the by-passing of fluids unquenched through the perforations made in the lower portion of the combustion-tube.

It has previously been shown that the stream of water supplying the cooling-chamber constitutes, at its first entrance, a heat-absorbing and hence a temperature-controlling spray or film, and that this spray or film is larger or smaller or non-existent according to the delivery of the pump and the precise design of the parts. The delivery of the pump depends upon the proportion of the total pumped water which is by-passed by the controller 300, the throttling action of the controller-valve 234 being gradual. Furthermore the graded amount of the by-passing has been shown to be controlled by thermostatic means. Therefore the pump sprays water into generator 100 in larger or smaller quantities delicately graded, said gradation being effected thermostatically by a delicate alteration of the pressure differential. Three distinct influences therefore coöperate to control superheat, each under delicate control and changing gradually. If superheats are high, water in-flow increases, covers perforations, covers surface and bathes the flame. If superheats are low the converse influences act simultaneously to restore them to the point determined by the thermostat.

1300 is a glass-legged U-tube containing a water-column receiving on one end the initial air-pressure from pipe 66 and on the other the sub-terminal pressure from pipes 130 and 129 whereby the difference between these pressures, or, in other words the total differential of the generator may be visually indicated.

In the operation of the I—T valve in the head of the generator 100 it has been assumed that the differential pressure controlling the port-opening effected by the valve remains substantially constant except for the influence of the thermostat 239, thus affording the same difference between initial and terminal pressures at all pressures in the system. As these pressures normally tend to rise up to the point of release established by diaphragm 189 the densities of fluids controlled by the I—T valve will vary. Assuming at any instant a constant quantity of fluids burned in the generator, it is evident that for a higher pressure and fluid-density the velocity past the cone-valve 102 will diminish. In order to maintain this velocity constant, I provide for increasing the differential as pressures increase, this being effected by means of a solenoid 249 pulling downwardly on the lever 241 and having in its circuit 250 a battery 251 and a rheostat 252 whose arm is controlled by the spindle 188 of the diaphragm 189. Therefore, as the pressure in the air-conduit 66 rises above a predetermined point the resistance will be decreased and the pull of the solenoid increased, thereby increasing the differential.

At times of no engine-intake a small vent from the generator 100 is required in order to maintain the pilot or main flames, and this is furnished by means of a hand-controlled vent-pipe 253, seen at the right of the generator 100 (Fig. 1) or by means of an automatically controlled vent-valve 254 operated by a solenoid 255 in whose circuit 256 is a battery 257 and a rheostat 258 whose arm is controlled by the sleeve of the governor 55. As engine cut-off increases under light or negative load to a predetermined point, the resistance in the solenoid circuit is made such as to open the vent-valve 254 and permit the generator to vent through branch 259 and pipe 233 to the engine-receiver 93, or through an extension pipe 260 with stop-valve 261 to the exhaust-pipe 262 of the engine 50. Ordinarily the extension 260 will be employed in services where periods of very light or negative load are encountered. For other services of less variation in load the generator may vent to the receiver 93, the governor thereby controlling engine speed by a by-passing of generator fluid into the low-pressure cylinder. This apparatus may be started by air pressure stored in a reservoir or, more desirably, by an auxiliary boiler supplying steam to engine 50. The preferred method of starting generator 100 is to first open stop-valve 226 (Fig. 26) in the release-branch 225 and release the output of the gas-compressor back to the suction side of said compressor. Check-valve 63 prevents injury to the gas-bag 62. Air-pressure is allowed to rise and for this purpose the pressure-balance release-mechanism 86 (Fig. 1) may be temporarily put out of commission by closing a stop-valve 351. Air-pressure reaching the initial sides of the I—T diaphragms in the generator-head opens the I—T valves and an air-flow occurs through the generator under I—T control. At first the secondary-air conduit 136 is shut off by its stop-valve 137. The igniter-thimble 113 at a suitable time is heated by its burner 162 and, if desired, a portion of the main air-flow may be diverted around said igniter through by-pass pipe 168, in order to avoid cooling of the igniter. Stop-valve 226 at any time may then be closed and the gas-release stopped, whereupon gas-pressure will rise and gas will join the air flowing through the combustion-chamber. The super-initial pressure of reservoirs 84, 85 furnished by any suitable means first becomes effective and a diagonal flow of combustible mixture occurs through the nozzle 165 and impinging upon the red-hot ignition-thimble becomes ignited and projects a flame into the axial region of the combustion-tube. This ignites the main flow of fluid past the cone-valve and thereafter combustion proceeds in the normal manner. The secondary-air-conduit 136 is opened when desired to supply secondary air to the main burner flow.

The products of combustion may at first find the cooling-chamber scantily supplied with water and be allowed to pass on unquenched into the engine-conduit and engine, their full heat being employed in warming up the metal parts. Whenever the throttle-valve in engine-pipe 68 is opened, the combustion-products, of course, assist in driving the engine. As soon as water-level has risen to cover the ends of the combustion-tube the water assumes control of temperature conditions and the apparatus soon attains full working pressure, which I prefer to establish at the high level of from 250 to 350 pounds per square inch.

I claim:—

1. A generator for constant-pressure internal-combustion motor-systems comprising a closed combustion-chamber, a burner at the entrance thereof having passages for compressed air and fuel, an automatic resistance-valve at said entrance operated by the pressure of one of said fluids for controlling one or more of the fluids, and means in the path of one of the fluids immediately back of the point of issue thereof for producing a twisting motion of said fluid in the combustion-chamber.

2. A generator for constant-pressure internal-combustion motor-systems comprising a closed combustion-chamber, a burner therefor having means for mixing compressed air and fuel, and an adjustable resistance-valve in said burner controlling the entrance of one of said fluids into the combustion-chamber and formed with inclined passages for the fluid which it controls, whereby the issuing current is given a twisting motion.

3. In constant-pressure power apparatus the combination of a pressure combustion-chamber, a burner therefor, a resistance-valve for said burner controlled differentially by the pressures initial and terminal to the valve, and means whereby said valve produces a twisting motion of the fluid entering the combustion-chamber.

4. In constant-pressure power apparatus the combination of a pressure combustion-chamber and a helical-fluted resistance-valve controlling the flow of combustion fluid to said chamber and controlled differentially by the pressures initial and terminal to the valve.

5. A generator for constant-pressure internal-combustion motor-systems comprising a closed combustion-chamber, a burner therefor having a conduit for compressed-air, a valve movable toward and from a valve-seat at the discharge mouth of said conduit, and a fuel-conduit formed in the stem of said valve and having a discharge-opening in the seating face of the valve.

6. In constant-pressure power apparatus the combination of a pressure combustion-chamber having a burner, a cone-valve for the burner having external helical flutes, means for conducting compressed air past said valve on the outside thereof and means for conducting compressed gas through said valve to mix with the air.

7. In constant-pressure power apparatus, the combination of a pressure combustion-chamber, and means to project currents of combustion fluid into said chamber axially in opposite directions, said means adapted to mix the counter currents and support the combustion of a flame at their point of intermixture.

8. A generator for constant-pressure internal-combustion motor-systems comprising a closed combustion-chamber, a main burner having means for projecting a twisting flow of air-and-fuel mixture into said chamber, and means additional to said burner for projecting an oppositely-twisting secondary flow of combustion-fluid toward said burner from a point within the combustion-chamber.

9. In constant-pressure power apparatus the combination of a pressure combustion-chamber having a burner at one end provided with means for injecting a mixture of air and fuel into said combustion-chamber, and a pipe supported at a point adjacent the other end of the combustion-chamber for supplying secondary air to the chamber in a direction counter to the flow of mixture from said burner, to commingle with said burner mixture and aid in the combustion thereof.

10. In constant-pressure power apparatus the combination of a combustion-tube having a burner at one end and an outlet at the other end, and a substantially axial secondary air-pipe supported from a point outside of said combustion-tube and extending into the combustion-chamber to mix its air with the flaming burner fluids.

11. In constant-pressure power apparatus the combination of a combustion-chamber having a burner, and a secondary-air pipe supported from beyond said burner and having substantially tangential outlets.

12. In constant-pressure power apparatus the combination of a pressure combustion-chamber, means to supply pressure fluids continuously thereto for supporting combustion, a secondary-air pipe within the combustion-chamber, and means to water-jacket the said secondary pipe.

13. In constant-pressure power apparatus the combination of a pressure combustion-chamber, an air-pipe discharging thereinto, and a water-jacket for said pipe discharging into the path of the products of combustion.

14. In constant-pressure power apparatus the combination of a pressure combustion-chamber, an air-pipe discharging thereinto, and a water-jacket for said pipe discharging into the combustion-chamber.

15. In internal-combustion power apparatus the combination of a combustion-chamber, a water-pot in the line of the products of combustion, and means to discharge a water-spray into said products at a point anterior to said water-pot.

16. In internal-combustion power apparatus the combination of a pressure combustion-chamber having a water-pot to receive the products of combustion, means for supplying water to said pot, means for supplying a spray in the path of said products, and means controlled by the temperature of the mixed fluid issuing from the water-pot for controlling the quantity of water supplied.

17. In constant-pressure power apparatus the combination of a pressure combustion-tube, means to supply pressure air and fuel thereto, and means for discharging a water-spray from the middle region of said tube outwardly toward the walls of the tube.

18. In internal-combustion power apparatus the combination of a pressure combustion-chamber, means for forming a water-pool in the path of the products of combustion from said chamber, means for forming a water-spray in said path above the pool, and level-controlled means for supplying water to said pool.

19. In internal-combustion power apparatus the combination of a pressure combustion-chamber, a cooling-chamber for the products of combustion, means to supply water to said cooling-chamber, and a labyrinthine superheating passage leading from the cooling-chamber and jacketing the combustion-chamber.

20. In internal-combustion power apparatus the combination of a pressure hot-gas tube, means for forming a pool of water immersing the outlet of said tube, and a plurality of concentric sleeves jacketing the tube and arranged to produce a flow of steam and products of combustion inwardly toward the tube.

21. In internal-combustion power apparatus the combination of a pressure combustion-chamber, a water-pot embracing the outlet thereof, and a baffle in said water-pot forming a settling-chamber below it.

22. In internal-combustion power apparatus the combination of a generator having a water-pot, a combustion-tube opening thereinto, and a conical baffle in the water-pot alined with the outlet of said combustion-tube.

23. In internal-combustion power apparatus the combination of a generator having a water-pot, a combustion-tube opening downwardly into said pot, and a conical baffle located in the water-pot below the end of said combustion-tube and formed with circulation apertures.

24. In constant-pressure power apparatus the combination of a pressure combustion-chamber having a removable liner, a burner for said combustion-chamber, means for supplying primary air and fuel to the burner, and means for supplying secondary air to the burner around said liner.

25. In constant-pressure power apparatus the combination of a pressure combustion-chamber having a burner, means to supply water in the path of the products of combustion, means to supply secondary air to the burner around the root of the combustion-chamber, and means to jacket the secondary-air passage with the steam and products of combustion.

26. In constant-pressure power apparatus the combination of a pressure combustion-chamber, and a non-jacketing replicate air-passage leading thereto and heated wholly by backward conduction from the walls of the chamber.

27. In constant-pressure power apparatus the combination of a pressure combustion-chamber having a burner, and a helical-walled air-passage leading to said burner and heated by conduction from the walls of the combustion-chamber.

28. In constant-pressure power apparatus the combination of a pressure combustion-chamber, a burner therefor having an automatic resistance-valve for controlling the supply of combustion fluid to said chamber, and a valve-seat member provided with a helical air-passage.

29. In constant-pressure power apparatus the combination of a pressure combustion-chamber having a burner, a member forming a wall of said burner and having air-heating fins, an air-efflux opening from said fins into the middle region of said member, and a casing inclosing said fins and having an influx opening around one edge.

30. In constant-pressure power apparatus the combination of a pressure combustion-chamber having a burner, a vaned valve-seat member for said burner formed with a bore, an air-passage from the vanes entering said bore, a valve coöperating with the valve-seat member and having a valve-stem, and a piston on said valve-stem acting as a plug for the bore.

31. In constant-pressure power apparatus the combination of a pressure combustion-chamber having a burner, a vaned valve-seat member, a casing inclosing the vanes and having air-spaces on both sides of it connecting around one end of the casing, the inner air-space supplying primary air to the burner, and means for supplying secondary air from the outer air-space to the burner.

32. In constant-pressure power apparatus the combination of a pressure combustion-chamber having a burner, means to supply primary combustion-fluid thereto, an incandescence igniter terminating short of the axial region of the combustion-chamber, and a secondary burner directed into the axial region of the combustion-chamber so that its fluid impinges on the igniter.

33. In constant-pressure power apparatus the combination of a combustion-chamber having a burner, a valve controlling a supply of compressed air at the entrance to said burner and having an axial opening-and-closing movement, and a valve-member on said stem having an axial movement controlling the resistance of air passing to the burner and a rotatory movement controlling the distribution of air to the burner and to another locality.

34. In constant-pressure power apparatus the combination of a combustion-chamber having a burner, and a valve-device in the path of the burner-air having axial and rotatory adjustments one of which controls the resistance of the air and the other its distribution, and a gas-meter connected to rotate said device.

35. In constant-pressure power apparatus the combination of a combustion-chamber having a burner, means to supply compressed air and gas thereto, and a metering device in the gas-line controlling the air-supply and comprising a cylinder having outlet holes distributed in two dimensions, and a piston in said cylinder having axial and rotatory adjustments respectively for cutting off said holes.

36. In constant-pressure power apparatus the combination of a combustion-chamber having a burner, means of supplying compressed air and gas thereto, an air by-pass valve in the air-line, a floating piston in the gas-line controlling said by-pass valve, and means for varying the amount of controlling movement of said piston corresponding to a given quantity of gas-flow past the same.

37. In constant-pressure power apparatus the combination of a combustion-chamber having a burner, means for supplying compressed air thereto, an air by-pass around the burner, a valve-device having functions of control for both the burner and by-pass air, and means for reversing the said functions with respect to the normal controlling movement of the valve.

38. In constant-pressure power apparatus the combination of a pressure combustion-chamber having a burner, means for supplying compressed air thereto, means to supply fuel to the burner, a valve-device controlling the air-supply and comprising a cylinder having two sets of ports and a piston therein adapted to control said ports alternatively, automatic valve-operating connections for adjusting said valve according to the quantity of fuel going to the burner, and means for connecting said valve to control either set of ports.

39. In constant-pressure power apparatus the combination of a combustion-chamber having a burner, means to supply compressed air and gas thereto, an air-distributing valve, a gas release, a meter measuring the burner gas or the released gas and controlling said air-distributing valve, two sets of ports controlled by the air-valve, and means to set said valve to control either set of ports.

40. In constant-pressure power apparatus the combination of a combustion-chamber, means to supply compressed air thereto, a valve-seat in the air-line, having a plurality of ports, a valve having motion in two dimensions for controlling said ports, and additional means for varying the total area of ports available for control by the valve.

41. In constant-pressure power apparatus the combination of a combustion-chamber, means to supply compressed air thereto, a valve-cylinder in the air-line having a series of ports, a valve in said cylinder having both axial and rotatory movements controlling said ports, and a rotatory shutter on the outside of said cylinder having means for shutting off said ports successively.

42. In constant-pressure power apparatus the combination of a pressure combustion-chamber, a cooling-chamber in the path of the products of combustion, means to supply water to said cooling-chamber, an eduction conduit from said cooling-chamber, a conduit for by-passing products of combustion from the combustion-chamber around the cooling-chamber into the eduction conduit, and a refractory valve in said by-pass.

43. In constant-pressure power apparatus the combination of a pressure combustion-chamber, a cooling-chamber in the line of the combustion products, means for by-passing products of combustion unquenched around said cooling-chamber, and means for varying, independently of the water-level in said cooling-chamber, the quantity of gases by-passed.

44. In constant-pressure power apparatus the combination of a combustion-chamber, a cooling-chamber in the path of the products of combustion, means to supply water to said cooling-chamber, means for by-passing unquenched products of combustion around said cooling-chamber into the outlet therefrom, and means controlled by the temperature of the efflux from said cooling-chamber for varying the quantity of products by-passed.

45. In constant-pressure power apparatus the combination of a combustion-chamber, means to maintain a pool of water in the path of the products of combustion, an eduction conduit for the mixed steam and gases, means to by-pass unquenched gases, and a thermostat associated with the said conduit and controlling the quantity of unquenched gases by-passed.

46. In constant-pressure power apparatus the combination of a generator having a burner and a cooling-chamber in the path of the products of combustion, a U water-tube including the combustion-chamber, automatic means for maintaining a constant level of water in the outer leg of the U, and means for controlling the pressure of gases on the inner leg whereby the cooling-chamber level is varied.

47. In constant-pressure power apparatus the combination of a pressure combustion-chamber having a burner, a resistance device in the path of combustion fluid, a cooling-chamber in the path of the products of combustion, and means controlled by the temperature of the mixture of gases and steam issuing from the cooling-chamber for varying the resistance imposed by said device.

48. In constant-pressure power apparatus the combination of a combustion-tube having a water-immersed outlet, an eduction conduit for the mixture of steam and gases, a resistance-valve for the burner-fluid, and a thermostat associated with said conduit for controlling the position of said valve.

49. In constant-pressure power apparatus the combination of a combustion-chamber having a burner, a resistance-valve controlling the burner fluid and controlled differentially by the pressures initial and terminal to the valve, means to supply a mechanical pressure in aid of the terminal pressure, and means controlled by the temperature of the gases from said combustion-chamber for varying said mechanical pressure.

50. In constant-pressure power apparatus the combination of a generator including a combustion-tube with a burner at one end and an immersed outlet at the other end, a water-pot for immersing said outlet, an extension forming a U with said pot, means for automatically controlling the water-level in the outer leg of the U, a resistance-valve controlling the passage of the pressure-fluid to the burner and differentially controlled by the pressures initial and terminal to the said valve, an eduction-conduit leading from above the water-pot, and a thermostat associated with said conduit and controlling the position of the resistance-valve.

51. In constant-pressure power apparatus the combination of a pressure combustion-chamber having a burner, an adjustable resistance device in the path of burner fluid, a liquid U column, means for establishing on the respective ends of said column the pressures initial and terminal to the said resistance device, and means for visually indicating the relative level at the ends of the column.

52. In internal-combustion power apparatus the combination of a combustion-chamber, means to supply combustion fluid under pressure, a resistance-valve for said fluid controlled differentially by the pressures initial and terminal to the valve, means for imposing a mechanical pressure in aid of the terminal pressure, and means controlled by the absolute pressure of the system for varying the mechanical pressure.

53. In internal-combustion power apparatus the combination of a pressure combustion-chamber, a resistance-valve controlling the combustion-fluid and differentially controlled by the pressures initial and terminal to the valve, and connections whereby the differential of the valve is increased as the pressure of the fluid increases and vice versa.

54. In internal-combustion power apparatus the combination of a pressure combustion-chamber having a vent, an engine supplied by said chamber, and means controlled by the speed of said engine for operating the vent.

55. In constant-pressure power apparatus the combination of a pressure combustion-chamber, a serial-expansion engine supplied thereby, a by-pass from the combustion-chamber entering the engine between its stages and having a valve, and means controlled by the speed of the engine for operating said valve.

56. In constant-pressure power apparatus the combination of a pressure combustion-chamber having a plurality of inlets for combustion-fluid, and automatic means whereby said inlets are opened in succession on rising pressure.

57. In constant-pressure power apparatus the combination of a pressure combustion-chamber having a plurality of inlets for combustion-fluid, valves controlling said inlets and subject differentially to the pressures initial and terminal to the valves, and means whereby the differentials of the several valves may be graded to cause the valves to open successively on rising pressures.

58. In constant-pressure power apparatus the combination of a pressure combustion-chamber, and two successively-opening valves controlling the flow of combustible mixture to said chamber, the later-opening one of said valves controlling the main flame and the earlier-opening one controlling a pilot flame.

In testimony whereof I have hereunto set my hand in the presence of two subscribing witnesses, the 14th day of August 1905.

EDWARD P. NOYES.

Witnesses:
ARTHUR H. BROWN,
ALBERT KLYVER.